J. MAHER.
AUTOMATIC WEIGHING MACHINE.
APPLICATION FILED OCT. 1, 1910.

998,106.

Patented July 18, 1911.

3 SHEETS—SHEET 1.

WITNESSES:
J. Ray Abbey
N. M. Angus

John Maher  INVENTOR

BY

Geo B Willcox  ATTORNEY

J. MAHER.
AUTOMATIC WEIGHING MACHINE.
APPLICATION FILED OCT. 1, 1910.
998,106.
Patented July 18, 1911.
3 SHEETS—SHEET 2.
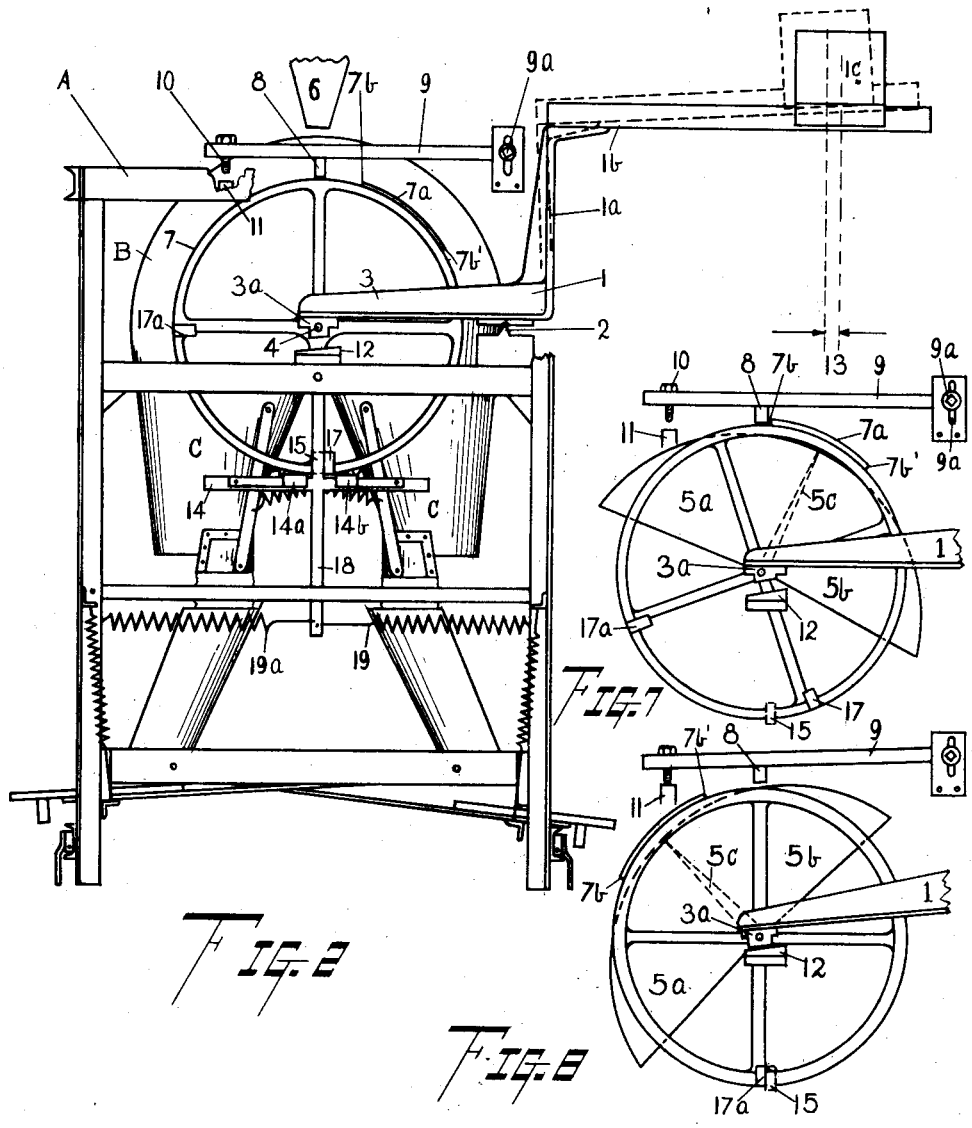
WITNESSES:
J. Ray Abbey
N. M. Angus
John Maher  INVENTOR
BY
Geo. B. Willcox  ATTORNEY

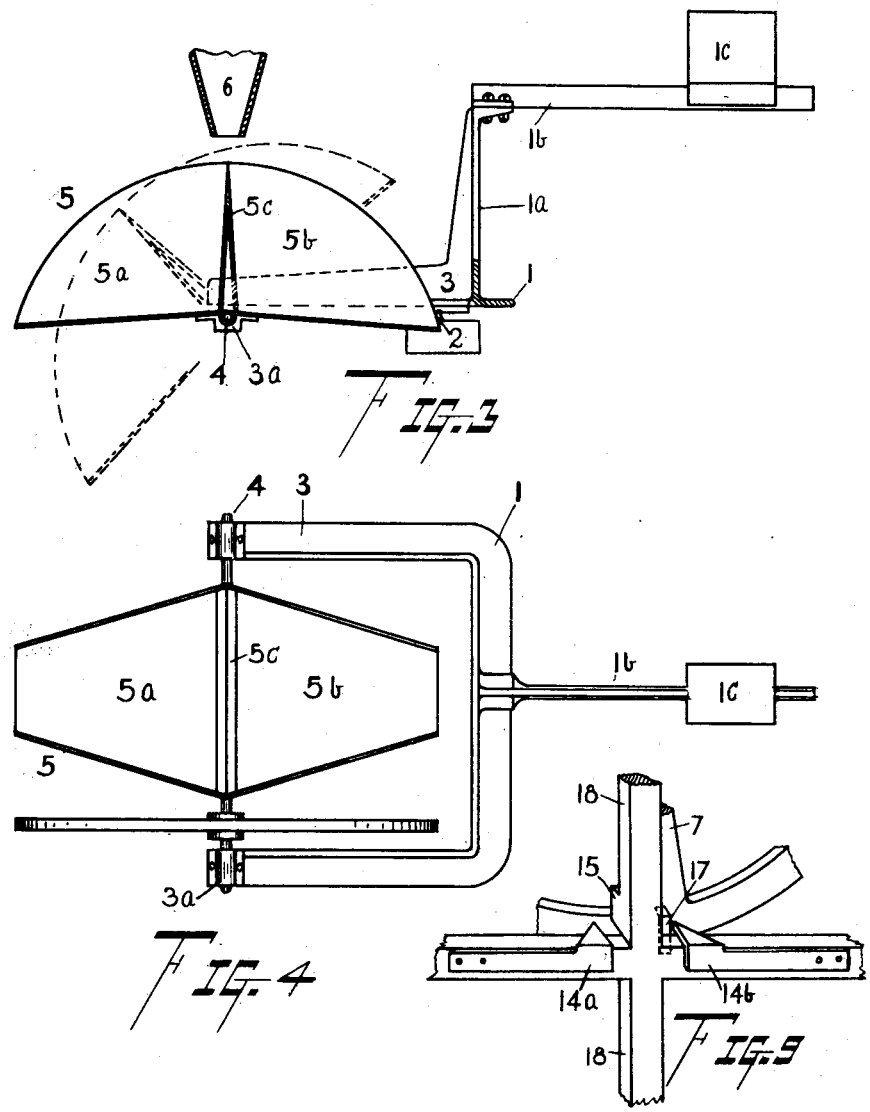

UNITED STATES PATENT OFFICE.

JOHN MAHER, OF ALPENA, MICHIGAN.

AUTOMATIC WEIGHING-MACHINE.

998,106.  Specification of Letters Patent.  Patented July 18, 1911.

Application filed October 1, 1910. Serial No. 584,953.

*To all whom it may concern:*

Be it known that I, JOHN MAHER, a citizen of the United States, residing at Alpena, in the county of Alpena and State of Michigan, have invented certain new and useful Improvements in Automatic Weighing-Machines; and I do hereby declare the following to be a full, clear, and exact description of the invention, such as will enable others skilled in the art to which it appertains to make and use the same.

This invention relates to automatic weighing machines and pertains more particularly to that class of machines adapted to the automatic weighing of Portland cement and similar substances.

The object of the invention is to provide a counter-balancing device operating in such a manner that the leverage of the counter-balance weight will be reduced immediately the weight of material in one compartment of the hopper has reached the balancing point. By this means the weight of the charge is suddenly enabled to exert power to trip the locking device of the tilting hopper, dump the contents of the hopper, and to return the hopper into position for receiving a new charge.

The invention further comprises, in combination with a double-compartment tilting hopper, means for shutting off the supply from one of said compartments and simultaneously dumping the contents of that compartment when the weight of the material in the compartment is sufficient to counterbalance the weight on the scale beam.

A further object of my improvement is to so arrange the machine that all of the working parts likely to require attention are out of contact with the material and readily accessible.

With these and certain other objects in view, which will appear later in the specification, my invention consists in the device illustrated in the accompanying drawings, in which—

Figure 1:
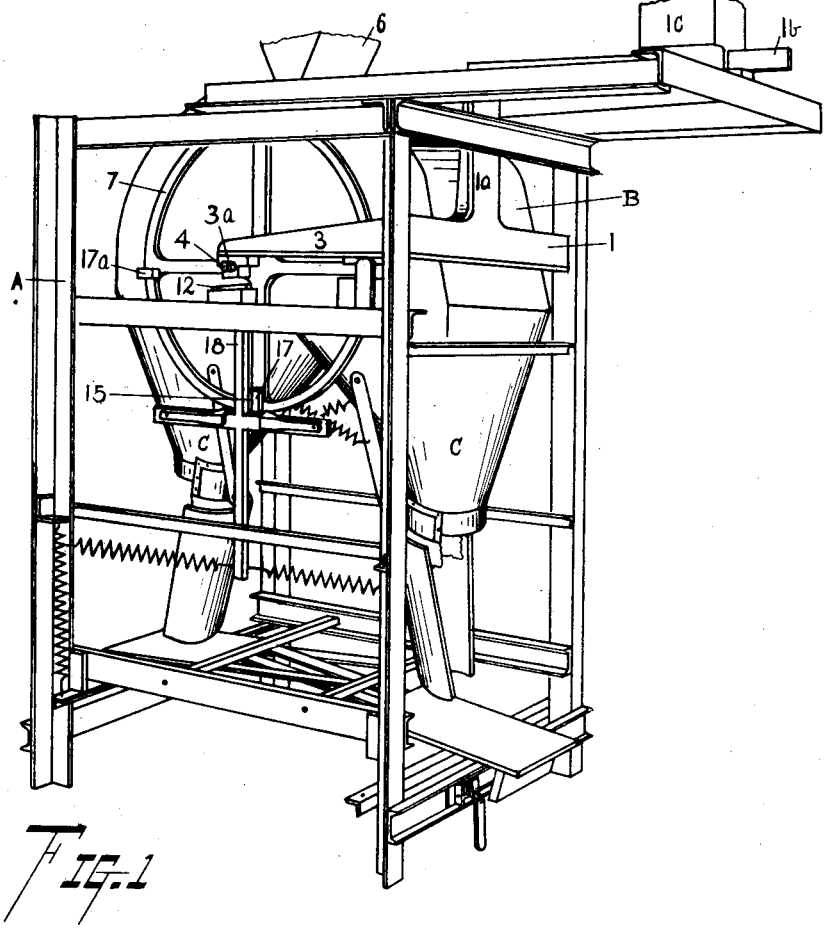
Figure 5:
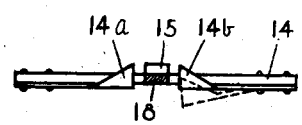
Figure 6:
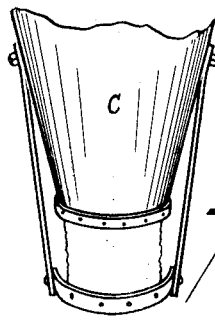

Figure 1 is a perspective view of the complete machine, Fig. 2 is a side elevation, Fig. 3 is a side view of the hopper and balancing bar, Fig. 4 is a top plan view of the hopper, Fig. 5 is a top plan view of the stop device by which the tilting of the hopper is limited and the hopper is locked in position to receive a new charge, Fig. 6 is a detail of the end of one of the discharge spouts, Fig. 7 is a fragmentary view showing the relative position of the hopper and stops just before dumping, Fig. 8 is a similar view of the same parts while discharging, and Fig. 9 is a perspective of the device by which the hopper is brought to rest after tilting.

As is clearly shown in the drawings, the weighing mechanism consists in a scale beam 1 mounted on V-blocks 2 and having rearwardly projecting arms 3 provided with bearings $3^a$. In the bearings $3^a$ is journaled a shaft 4 to which is fixed a double hopper 5 adapted to tilt, the shaft turning in the bearings $3^a$. The hopper 5 is separated into two compartments $5^a$ and $5^b$ by means of a partition $5^c$, which is adapted to travel across the supply nozzle 6 when the hopper 5 oscillates.

To control the tilting movement of the hopper 5, a wheel 7 is keyed to the shaft 4. This wheel actuates all of the mechanism by which the tilting of the hopper and its return to its initial position is effected. The upper periphery of the wheel 7 carries a projecting rim $7^a$ or equivalent, the ends of which form shoulders $7^b$ and $7^{b'}$. To prevent the hopper 5 from tilting until it has received its necessary load, a latch 8 is provided, adapted to take against the shoulders $7^b$ or $7^{b'}$, as the case may be. The latch 8 is carried on a hinged horizontally arranged arm 9, and at the free end of arm 9 is a bolt or set screw 10 adapted to take against a projection 11 preferably carried by the frame A of the machine, to limit the downward movement of bolt 10, for the purpose presently to be set forth.

The scale beam 1 carries a vertical arm $1^a$, from the upper end of which projects a horizontal arm $1^b$ carrying a counter-balance weight $1^c$.

When one of the hopper compartments $5^a$ or $5^b$ (see Figs. 3 and 4) has received its necessary load, the end of the scale beam on which the hopper is mounted, drops a total distance of say one and a quarter inches, until the bearings $3^a$ rest upon the buffer 12 carried by the frame A. Owing to the shape of the scale beam, when the hopper has received its charge and descends, the counter-weight $1^c$ moves up and in a short distance, as indicated at 13 in Fig. 2. The inward movement is equivalent to shortening the lever arm $1^b$, and in practice this is equivalent to lightening the weight $1^c$, while the weight in the hopper remains unchanged. This reduction in leverage of weight $1^c$ enables the charge, immediately after balancing, to exert energy, due to its drop, and enables this energy to be used for performing the mechanical functions of releasing the weighing mechanism, dumping the charge without adding excess weight to the charge. All contact with the latch 8 is thereby overcome.

The lower extremity of the latch 8 rests normally on the rim of the wheel 7, as shown in Fig. 7, while the latch is in engagement with either of the shoulders $7^b$ or $7^{b'}$. When the hopper descends, as above described, the hinged arm 9 descends also. The shoulder $7^b$ bears against the latch 8 until the bearing $3^a$ of the hopper has descended almost to the buffer 12. The bolt 10 thereupon brings up against the projection 11, as shown in Fig. 8. A slight further descent of the hopper releases the shoulder $7^b$ from the latch 8, and the charge in compartment $5^a$ tilts the hopper, as indicated in Fig. 8, and pours out. The act of tilting upon the release of shoulder $7^b$ cuts off the supply from the compartment $5^a$ by quickly passing the upper edge of partition $5^c$ across the supply nozzle 6, which now delivers into compartment $5^b$. The dumping or tilting position of either of the compartments $5^a$ or $5^b$ corresponds with the receiving position of the other compartment, as shown by dotted lines in Fig. 3, so that one or the other of the compartments is always receiving material from the supply nozzle 6.

To check the tilting movement of the hopper and bring it to rest, I provide the device illustrated in top plan view in Fig. 5 and in perspective in Fig. 9. A vertically disposed swinging arm 18 is pivoted at its upper end to the frame A. Attached to the lower end of arm 18 are two oppositely arranged springs 19 and $19^a$, the outer ends of which are secured to the frame A. The springs 19 and $19^a$ operate to keep the swinging arm 8 normally central, but permit the arm to yield slightly to one side or the other when the tilting of the hopper causes the projection 17 or $17^a$, carried by wheel 17, to strike a block 15 which is fixed to the inner face of arm 18. The impact of the projection 17 or $17^a$ against the block 15 causes the arm 18 to swing out of the vertical, but springs 19 and $19^a$ bring the wheel 7 and hopper 5 gently to rest by restoring arm 18 to its vertical position. A horizontal bar 14 is fixed to the vertical arm 18, the bar being provided with spring-pressed inwardly projecting latches $14^a$ and $14^b$. The space between the latch $14^a$ and block 15 is of sufficient width to receive the end of the projecting member $17^a$ when compartment $5^a$ is in its dumping position. The space between $14^b$ and 15 similarly receives the corresponding member 17 when compartment $5^b$ is in its dumping position.

The latches yield back when wiped by the projection 17 or $17^a$, but spring into place again and hold the wheel 7 locked to the arm 18 while the weighed charge is dumping. When the charge has dumped, counter-weight $1^c$ drops, raising the hopper and wheel, and lifting the projection 17 or $17^a$ out of engagement with the latch $14^b$ or $14^a$, thereby releasing the wheel. Before the projection has lifted free of the spring latch, the upper periphery of the wheel has reached the latch 8 and has begun to lift the bolt 10 from its resting place on the projection 11. Further lifting of the wheel 7 carries the arm 9 up with it. When projection 17 is clear of the spring latch, the weight of material that has been accumulating in compartment $5^b$, while $5^a$ was dumping, overbalances the hopper in the opposite direction and brings shoulder $7^{b'}$ into engagement with the latch 8. $7^{b'}$ remains in contact with latch 8 while compartment $5^b$ is filling, and the process of dumping is repeated as above described.

In order to adjust the pivoted end of arm 9 up or down with relation to the latch 8, I provide a vertical slot $9^{a'}$ or equivalent means in the arm by which the pivot $9^a$ is supported so that the height of the pivot may be adjusted as desired.

The tilting hopper is preferably inclosed in a suitable housing B, provided with downwardly projecting discharge spouts C, adapted to deliver into any suitable sacking device.

Having disclosed my invention, what I claim and desire to secure by Letters Patent, is:—

1. In a weighing machine, the combination with a pivotally mounted scale beam having one arm offset upwardly and laterally and carrying a counter-balance weight, a tilting hopper pivotally mounted on the other arm of said beam, a wheel fixed to said hopper, shoulders on the upper periphery of said wheel, a vertically movable latch adapted to releasably engage said shoulders, means for releasing said latch during the downward movement of said wheel, projections carried by the lower periphery of said wheel, a vertically pivoted arm, a stop carried by said arm and adapted to engage said last-named projections, and yielding means attached to said arm for retaining it normally in its vertical position.

2. In a weighing machine, the combination with a pivotally mounted scale beam having one arm offset upwardly and laterally and carrying a counter-balance weight, a tilting hopper pivotally mounted on the other arm of said beam, a wheel fixed to said hopper, shoulders on the upper periphery of said wheel, a vertically movable latch adapted to releasably engage said shoulders, means for releasing said latch during the downward movement of said wheel, and means engaging said wheel for preventing its rotation when in its lowest position.

3. In combination with a weighing machine, a scale beam, a tilting hopper pivotally mounted on the end of said beam, a wheel fixed to said hopper, and means carried by said wheel, adapted to automatically lock and unlock the hopper in its various tilted positions at the upper and lower extremities of vertical travel of the hopper and wheel.

In testimony whereof, I affix my signature in presence of two witnesses.

JOHN MAHER.

Witnesses:
CHRISTINE A. BRAIDEL,
NELLIE M. ANGUS.

Copies of this patent may be obtained for five cents each, by addressing the "Commissioner of Patents, Washington, D. C."